United States Patent [19]
Uemiya et al.

[11] Patent Number: 5,129,029
[45] Date of Patent: Jul. 7, 1992

[54] APPARATUS AND METHOD OF PRODUCING FIBER WAVELENGTH-CONVERSION ELEMENT

[75] Inventors: Takafumi Uemiya; Naota Uenishi; Akira Mizoguchi; Yasuzi Ohgaki; Yasuhiro Hattori, all of Osaka, Japan

[73] Assignee: Sumitomo Electric Industries, Ltd., Osaka, Japan

[21] Appl. No.: 738,305

[22] Filed: Jul. 31, 1991

[30] Foreign Application Priority Data

Jul. 31, 1990 [JP] Japan ................................. 2-204669

[51] Int. Cl.$^5$ ........................... G02B 6/02; H03F 7/00; C30B 21/00; B05D 5/06
[52] U.S. Cl. .................................. 385/122; 385/123; 385/141; 385/143; 359/326; 359/332; 156/600; 156/608; 427/163; 427/201
[58] Field of Search ................ 385/122, 123, 128, 141, 385/142, 143; 359/326, 328, 332; 156/600, 608; 427/163, 201

[56] References Cited

U.S. PATENT DOCUMENTS

| 4,515,429 | 5/1985 | Smith et al. | 385/122 |
| 4,838,638 | 6/1989 | Kamiyama et al. | 385/122 |
| 4,909,595 | 3/1990 | Okazaki et al. | 385/122 |
| 4,962,993 | 10/1990 | Okamoto et al. | 385/122 |
| 4,981,337 | 1/1991 | Okamoto et al. | 385/122 |
| 4,991,931 | 2/1991 | Harada et al. | 359/326 |
| 5,046,817 | 9/1991 | Uenishi et al. | 385/122 |
| 5,049,762 | 9/1991 | Katoh | 359/332 |
| 5,061,038 | 10/1991 | Chikuma et al. | 385/122 |

FOREIGN PATENT DOCUMENTS

| 0398271 | 11/1990 | European Pat. Off. | 385/122 X |
| 2-254426 | 10/1990 | Japan | 385/122 X |

Primary Examiner—Brian Healy
Attorney, Agent, or Firm—Cushman, Darby & Cushman

[57] ABSTRACT

A method of coating the ends of a fiber wavelength-conversion element with a macromolecular film. This serves to protect the crystal core and change in quality without changing the state of the core end surface.

13 Claims, 1 Drawing Sheet

APPARATUS AND METHOD OF PRODUCING FIBER WAVELENGTH-CONVERSION ELEMENT

BACKGROUND OF THE INVENTION

1. Field of the Invention

The present invention relates to a method of producing a fiber wavelength-conversion element with a core made of organic nonlinear optical crystal and a clad made of glass which is coated on the incident and outgoing end surfaces of the fiber with a macromolecular film. Optionally, particles and macromolecules may be packed into a recessed portion of an outgoing end surface.

2. Description of Related Art

Conventionally, laser light has been wavelength-converted into second harmonic waves thereof or the like by utilizing a non-linear optical material. A wavelength-conversion element for performing the wavelength conversion of the bulk crystal type has been described, for example, in A. Yarive, "Foundation of Optical Electronics", (translated by Kunio Ota and Takeshi Kamiya), MARUZEN Co. Ltd., pp. 200-204.

Recently, however, a fiber wavelength-conversion element has been used in which a material having large nonlinearity and having either small birefringence or none at all may be used and in which the phase matching between the fundamental wave and the second higher harmonic may be easily attained. This fiber wavelength-conversion element has a configuration in which a core of nonlinear optical material single crystal is formed in a clad of glass (for example, reference is made to Microoptics News of The Group of Microoptics, The Optical Society of Japan (The Japan Society of Applied Physics), Vol. 3, No. 2, pp. 28-32).

Further, a wavelength-conversion element having the same advantages as those of the fiber wavelength-conversion element is known in which as a core, an optical waveguide is formed of single crystal of a nonlinear optical material between two glass plates constituting a clad (for example, reference is made to Japanese Patent Unexamined Publication Nos. Sho. 63-15233 and Sho. 63-15234).

As the nonlinear optical material to be used for the core of the above fiber wavelength-conversion element, the use of a single crystal of an organic nonlinear optical material is recently proposed, although an inorganic nonlinear optical material such as $KH_2PO_4$, lithium niobate ($LiNbO_3$), or the like, has been used conventionally.

Organic nonlinear optical materials that can be used include, for example, 2-methyl-4-nitroaniline (MNA), metanitroaniline (mNA), 3-methyl-4-nitropyridine-1-oxide (POM), urea, N-(4-nitrophenyl)-(S)-prolinol (NPP), 2-{N-(4-nitrophenyl)-N-methylamino} acetonitrile (NPAN), 2-dimethylmethylamino-5-nitroacetamide (DAN), 2-N(α-methylbenzylamino)-5-nitropyridine (MBA-NP), or the like. These materials are described in "Nonlinear Optical Properties of Organic and Polymeric Materials", ACS SYMPOSIUM SERIES 233, edited by David J. Williams, American Chemical Society, 1983, "Organic Nonlinear Optical Material" supervised by Masao Kato and Hachiro Nakanishi, CMC Co., 1985, "Nonlinear Optical Properties of Organic Materials and Crystals", edited by D. S. Chemla and J. Zyss, Academic Press Inc., 1987, and "The Quality and Performance of The Organic Non-Linear Optical Material, 2-N(α-Methylbenzylamino)-5-Nitropyridine (MBA-NP)", Optical Communications, Vol. 63, No. 3, p. 223. Other organic non-linear optical materials which may be used are 3.5-dimethyl-1-(4-nitrophenyl)-pyrazole (hereinafter, referred to as PRA), 3,5-dimethyl-1-(4-nitrophenyl)-1,2,4-triazole, 2-ethyl-1-1(4-nitrophenyl) imidazole, 1-(4-nitrophenyl) pyrrole, 2-dimethylamino-1, 5-nitroacetanilide, 3-methyl-4-nitropyridine-N-oxide, or the like, as disclosed in Japanese Patent Unexamined Publication No. Sho. 62-210432.

A single crystal of the above organic nonlinear optical material is essentially superior to that of an inorganic material in the points of (i) the large nonlinear polarizability, (ii) the improved light damage property, (iii) the high-speed response to electric field and the like. For example, the above MNA has wavelength conversion efficiency about 2000 times as high as that of $LiNbO_3$.

In a fiber wavelength-conversion element using a single crystal of an organic nonlinear optical material as the core, the organic nonlinear optical crystal which is the core contacts with the atmosphere, such as surrounding air or the like, on the fiber end surfaces so that the quality of the core is sublimated or changed. Therefore, there has been a problem in that as time elapses, the wavelength conversion efficiency of the wavelength-conversion element and the incident coupling efficiency of a fundamental wave deteriorate remarkably and the occurrence of light loss increases.

As a method for solving the foregoing problem, Japanese Patent Unexamined Publication No. Hei. 2-79033 discloses a method of producing a wavelength-conversion element in which an organic non-linear optical material is dissolved in liquid resin to a saturated state and the solution is applied onto the end surfaces of a fiber. An organic nonlinear optical material is dissolved in liquid resin to a saturated state and the solution is applied onto the end surfaces of a fiber. An organic nonlinear optical material is however dissolved by about one weight percent even in liquid fluoresin having the lowest solubility.

In the foregoing method, therefore, if the temperature comes down by even 0.5° C. from the saturation temperature of the liquid resin in which the organic nonlinear optical material is dissolved, the crystal forming the core may be dissolved. If the temperature comes up by 0.5° C., on the contrary, the solution becomes supersaturated so that the organic nonlinear optical material deposits as crystal on the end surfaces of the core. As a result, it has been difficult to stably produce a light wavelength conversion element.

Further, Japanese Patent Unexamined Publication No. Hei. 2-79032 discloses a method of producing a fiber wavelength-conversion element in which the end surfaces of a fiber are coated with an aqueous solution of a vinyl acetate-acryl copolymer emulsion.

However, in this method, there has been a problem since the organic nonlinear optical material is somewhat dissolved in the aqueous solution, resulting in the reduction of the incident coupling efficiency of a fundamental wave. Further, this problem is remarkable in a fiber wave element having a core diameter (0.5–2 $\mu$m) capable of obtaining a high efficiency of wavelength conversion.

SUMMARY OF THE INVENTION

The present invention has been achieved in view of the foregoing problems, and an object of the present invention is to provide a method of stably producing a fiber wavelength-conversion element in which a core is made of organic nonlinear optical crystal and a clad is made of glass, and in which a macromolecular film is formed at its end surface/surfaces, without reducing the incident coupling efficiency of a fundamental wave.

The method of producing a wavelength conversion element according to the present invention solves the foregoing problems. After a core has been formed in a clad to thereby form a fiber according to either a fused liquid method or a solution method, an aqueous solution is prepared in which macromolecules are dispersed and the same organic nonlinear optical material as that forming the core is dissolved. This aqueous solution is applied onto each of the opposite end surfaces of the fiber and dried so as to harden in the form of a macromolecular film.

Since the solubility of the organic nonlinear optical material in water is exceedingly small and since the same nonlinear optical material as that forming the core is dissolved in the solution, the quantity of core eluting into the solution is negligibly small even when the solution is not saturated with the nonlinear optical material. Plus, even when the solution is super-saturated with the nonlinear optical material, the quantity of deposition of the organic nonlinear optical material in the form of single crystal is also negligibly small.

In the method according to the present invention, therefore, a macromolecular film can be formed on the end surfaces of a fiber without changing the state of the end surfaces of a core.

Further, the fiber wavelength conversion element obtained by the method according to the present invention never contacts with an atmosphere such as air or the like because of the macromolecular films formed on the opposite end surfaces of the element, and hence there is no possibility that the core will be sublimated or changed in quality.

Alternatively, the fiber wavelength-conversion element may be produced in a manner so that not only is a macromolecular film formed on the end surfaces as described above but there is also a recess portion which is not filled with the core which is formed in an outgoing end surface of the clad and the inside of the recess portion is filled with particles.

In the fiber wavelength-conversion element obtained by this alternative method, the core is prevented from having contact with the atmosphere because of the formation of a macromolecular film on the incident surface and the existence of particles with which a recess portion is filled on an outgoing end surface. Therefore, there is no possibility that the organic nonlinear optical crystal forming the core will be sublimated or changed in quality.

The invention also relates to a wavelength conversion element comprising an organic nonlinear optical crystal core, and a glass cladding, wherein at least one of an incident end and an outgoing end of said wavelength conversion element has a macromolecular film coating.

The invention further relates to a wavelength conversion element, wherein said outgoing end comprises a hollow portion packed with particles of abrasive material and macromolecules.

Specific parts in the figures are designated as follows:
a: the fiber wavelength-conversion element;
1 and 1b: the core;
2 and 2b: the clad;
3 and 3b: the macromolecular film;
a1 and 10b: the incident end surface;
a2 and 20b: the outgoing end surface; and
6b: the particle.

DETAILED DESCRIPTION OF THE INVENTION

According to the present invention, it has been found that a macromolecular film can be formed on a fiber end surface without changing the state of the core end surface in the fiber wavelength-conversion element obtained by the method according to the present invention.

As described above, in the method of producing a fiber wavelength-conversion element according to the present invention, macromolecular films are formed on the end surfaces of a fiber without changing the states of the end surfaces of the core. This makes it possible to stably produce a fiber wavelength-conversion element having macromolecular films at its end surfaces without reducing the incident coupling efficiency of a fundamental wave.

Further, in a fiber wavelength-conversion element obtained according to the present invention, organic nonlinear optical crystal which forms the core is never contacted with an atmosphere such as air or the like because the macromolecular films are formed on the opposite end surfaces of the fiber so that there is no possibility that the organic nonlinear optical crystal would be sublimated or changed in quality.

Further, in another method of producing a fiber wavelength-conversion element according to the present invention, organic nonlinear optical crystal which is a core is prevented from having contact with an atmosphere such as air or the like by having, in addition to a macromolecular film formed in the same manner as the foregoing case, particles filling a recessed portion of an outgoing end surface of the same, so that there is no possibility that the organic nonlinear optical crystal is sublimated or changed in quality. The present invention will be described in detail with reference to the figures and examples.

Figure 1:
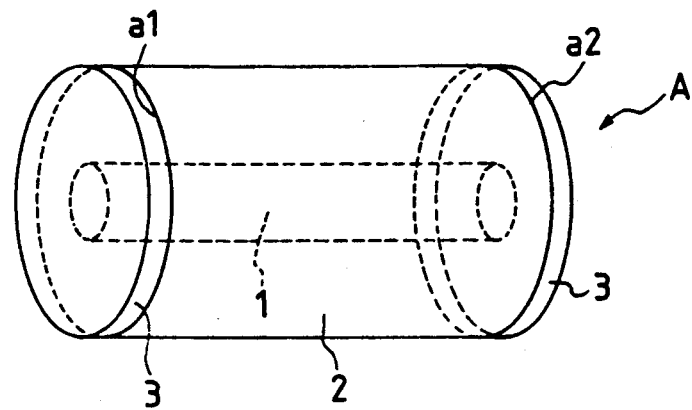
FIG. 1 is a perspective view showing an embodiment of the fiber wavelength-conversion element produced by the method according to the present invention.

FIG. 1 is a perspective view showing a fiber wavelength-conversion element obtained by the method according to the present invention.

In the fiber wavelength-conversion element A, a core 1 of organic nonlinear optical single crystal is formed in a clad 2 which is a glass capillary tube. Macromolecular films 3 are formed respectively on the opposite end surfaces a1 and a2 of the fiber.

As a method of producing the organic nonlinear optical single crystal (the core 1) in the capillary tube which will become the clad 2, it is possible to use one of two methods.

In the first method, the fused liquid method, a glass capillary tube is filled, by capillarity or the like, with a fused liquid of an organic nonlinear optical material. The tube is then cooled once so that the fused liquid therein is crystallized. The crystal in the glass capillary tube is then fused again, and finally the glass capillary tube is cooled from one end portion thereof toward the other end portion of the same so that a single crystal is grown in the glass capillary tube.

In the second method, a so-called solution method, the temperature of one end of a glass capillary tube containing a heated solution with an organic nonlinear optical material dissolved therein is rapidly decreased so as to deposit polycrystal as seed crystal. The entire solution is then cooled gradually and successively from one end of the glass capillary tube toward the other end of the same so that a single crystal is grown based on the seed crystal.

As the organic nonlinear optical material to form the core 1, the above-described conventionally-known material may be used.

As the capillary tube to form the clad 2, a tube formed of PYREX glass (trade name of CORNING JAPAN Inc.), lead glass, or the like may be used, which has an outer diameter of about 1 mm and an inner diameter of about 0.1-10 $\mu$m. Specifically, a fiber wavelength-conversion element having an inner diameter of a clad 2 the same as the diameter of the core 1, 0.5-2 $\mu$m, shows high wavelength conversion efficiency.

The macromolecular film 3 is formed in such a manner that after the organic nonlinear optical single crystal (core 1) is formed in the glass capillary tube (clad 2), a solution in which macromolecular compounds are dispersed and in which the same organic nonlinear optical material as that forming the core 1 is dissolved is applied and dried so as to be hardened.

It is preferable that the concentration of the organic non-linear optical material in the solution is made so as to be as near as possible to the saturation concentration and, at the same time, not higher than one weight percent, in order to maintain flatness on the surface of the crystal forming the core 1.

Examples of the macromolecule include: an acryl group macromolecule such as polymethyl methacrylate, polyethyl methacrylate, polypropyl methacrylate, polybutyl methacrylate, and the like; a styrene group macromolecule such as polystyrene, a styrene-acrylonitrile copolymer, an acrylonitrile-butadiene-styrene copolymer, a styrene-silicone copolymer, and the like; a vinyl acetate group macromolecule such as polyvinyl acetate, a vinyl acetate-vinyl chloride copolymer, a vinyl acetate-acrylonitrile copolymer, a vinyl acetate-acrylic acid copolymer, a vinyl acetate-maleic acid copolymer, a vinyl acetate-ethylene copolymer, and the like; and so on.

In view of the need to control the flatness and film thickness of the macromolecular film 3, it is preferable to select the rate of dispersion of the above macromolecule in the solution to be within a range of 5-30 weight percent.

The method of application of the solution is not particularly limited. Although any generally used means of application may be used, a spin coating application means is the most preferable one.

Further, the macromolecular film 3 can be made to be a reflection reduction film by accurately controlling the film thickness of the macromolecular film 3. The term "reflection reduction film" means a film satisfying the following expression:

$$nd = \left(\frac{1}{4} + \frac{m}{2}\right)\lambda$$

(in the expression, m represents an integer not smaller than 0; n, the refractive index of the film; d, the film thickness; and $\lambda$, a wavelength).

If the macromolecular film 3 satisfies the following expression, the refractive index of the macromolecular film 3 is zero.

$$n = \sqrt{ns}$$

(in the expression, n represents the refractive index of the film and ns represents the refractive index of the single crystal of the organic nonlinear optical material which is the core).

Further, a dielectric film of MgF$_2$ or the like may be formed on the macromolecular film 3 as a multilayer reflection reduction film. Formation of this film may improve the durability of the macromolecular film 3.

Figure 2:
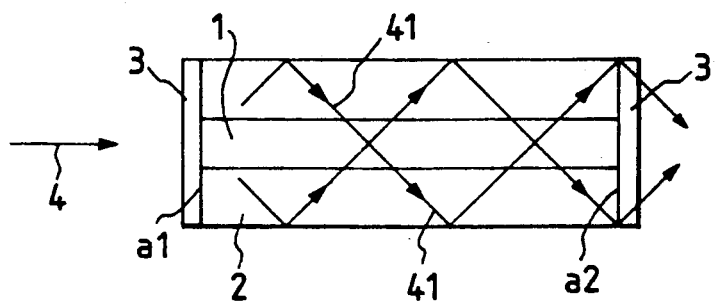
FIG. 2 is a sectional view showing the used state of the same embodiment.

The thus produced fiber wavelength-conversion element A is used in such a manner as shown in FIG. 2. That is, a fundamental wave 4 is led into the core 1 from the incident end surface a1 of the fiber wavelength-conversion element A. Then, the fundamental wave 4 is converted into a second harmonic 41 each having a wavelength half as long as that of the fundamental wave 4 through the single crystal of an organic nonlinear optical material such as PRA or the like forming the core 1. The second harmonic 41 advances from the incident end surface a1 toward the outgoing end surface a2 while repeating total internal reflection between outer surfaces 21 of the clad 2 in the element A. Further, in the case of Cerenkov radiation, phase matching is performed between the waveguide mode of the fundamental wave 4 in the core 1 and the radiation mode of the second harmonic 41 to the clad 2.

Then, a beam containing the second harmonic 41 comes out from the outgoing end surface a2. The outgoing beam further comes to the outside of the element A through the macromolecular film 3, and then passes through a filter (not shown) so that only the second harmonic 41 is taken out so as to be utilized.

Figure 3:
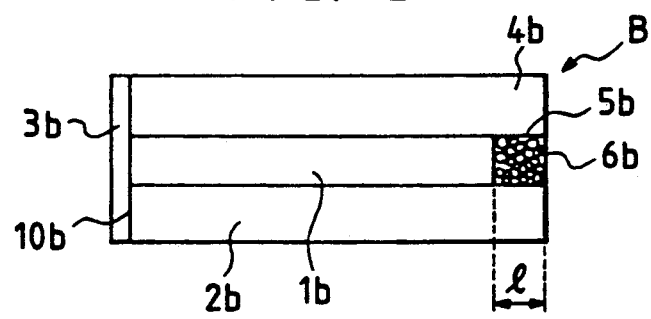
FIG. 3 is a sectional view showing a fiber wavelength-conversion element produced by another method according to the present invention.

In the case of producing a fiber wavelength-conversion element B shown in FIG. 3, on the other hand, a portion of a clad 2b having crystal 1b grown in the inside thereof is cut, and an outgoing end surface 20b side of the clad 2 is ground by aluminum oxide powder or the like. By this grinding, crystal forming the core 1b which is softer than glass forming the clad 2b is cut more deeply than the clad 2b, so that a recess portion which is not filled with the core 1b is formed in the crystal. Then, the recess portion is densely filled with particles 6b such as abrasive particles or abrasive dust of aluminum oxide powder or the like. Next, a macromolecular film 3b is formed on an incident end surface 10b, which is the other end surface, in the same manner as in the foregoing case.

Particularly when the outgoing end surface 20b is ground by an abrasive in which the abrasive particles are carried on a macromolecular fiber, the recess portion is filled with the abrasive particles as well as macromolecules from the macromolecular film, allowing the recess portion to be more densely filled.

If the fiber wave element B is used, the core 1b is prevented from contact with an atmosphere by the macromolecular film 3b formed on the incident end surface 10b and by the particles 6b on the outgoing end surface 20b, so that the organic nonlinear optical crystal which is the core 1b can be prevented from being sublimated or changed in quality.

Further, the fiber wavelength-conversion element B can be effectively used as a light source for an optical disk or the like because the outgoing end surface 20b is ground so that the wave front of an outgoing second harmonic can be prevented from being disturbed.

In the fiber wavelength-conversion element B, the macromolecular film or the reflection reduction film may be formed in the same manner as in the foregoing case after the hollow portion 5b of the clad 2b has been filled with the particles 6b.

EXAMPLES

Next, the present invention will be described more in detail with reference to examples and comparative examples.

EXAMPLE 1

A single crystal of PRA was formed in a capillary tube of PYREX glass having an inner diameter of 5 μm and an outer diameter of 0.5 mm to thereby obtain a fiber element.

PRA powder was added in excess to an aqueous solution (solid component of 25 weight percent) in which a polyacrylic acid was dispersed by a surfactant and the aqueous solution was agitated at room temperature for 30 minutes so as to dissolve the PRA powder in the aqueous solution. Next, the opposite end portions of the fiber element were cut, and the solution was applied onto the end surfaces immediately after the cutting through spin coating (4000 rpm × 10 seconds). Then, the solution was dried so as to be hardened to form macromolecular films of acryl group macromolecules to thereby obtain a fiber wavelength-conversion element.

When each of the end surfaces of the thus obtained fiber wavelength-conversion element was observed by an optical microscope, it was found that the single crystal of PRA which was the core was not dissolved but the end surfaces were observed to be specular. The same was found when a capillary tube having an inner diameter of 0.5-2 μm was used as the clad.

Furthermore, as above, the core was not dissolved and the end surfaces were observed to be specular when an aqueous solution, in which PRA was dissolved at 15° C. and acryl group macromolecules were dispersed and heated to 25° C., was used as a coating liquid for the macromolecular film.

Further, when the fiber wave element was maintained at 23° C. for one month, the state of the end surfaces did not change and the coupling with HeNe laser was good. This is because, since the solubility of PRA to water is not larger than $5 \times 10^{-5}$ mol/l, the quantity of core which dissolves into the solution before the coating dries and hardens is negligibly small even when the solution is not saturated with PRA. The quantity of PRA crystal deposited from the solution is also negligibly small because the degree of supersaturation is small even when the solution is super-saturated with PRA.

COMPARATIVE EXAMPLES 1-2

Macromolecular films were formed in the same manner as in Example 1 except that water in which no PRA was dissolved and a polyacrylic acid was dispersed was used in place of the foregoing solution to thereby obtain fiber wavelength-conversion elements having core diameters of 3 μm and 1 μm respectively.

In the thus formed fiber wavelength conversion element having a core diameter of 3 μm, the crystal surface of the fiber end surface was dissolved so as to become uneven. In the fiber wavelength-conversion element having a core diameter of 1μ, on the other hand, the crystal surface of the fiber end surface was dissolved so as to become so rough, even deeply below the surface of the coating, that the crystal surface was not observable by using an optical microscope.

Further, when the two fiber wavelength-conversion elements were cut and the fiber end surfaces were immersed in water for 10 seconds immediately after the cutting, the cut end surfaces came to be in the same state as described above.

COMPARATIVE EXAMPLES 3-8

Respective compounds shown in Table 1 were mixed as the liquid polymer at the rates shown in Table 1. PRA was dissolved in each of the liquid polymers, and saturated at 25° C. PRA is dissolved in the liquid polymer at 25° C. by about one weight percent.

The liquid polymer was applied onto one fiber end surface by using a spin coater (8000 rpm for 10 seconds) as in Example 1.

The one fiber end was irradiated with ultraviolet rays in an atmosphere of nitrogen at temperatures of 24.5° C., 25° C., and 25.5° C. to thereby form a hardened film on the one fiber end. Next, the other fiber end surface was treated in the same manner as above.

When the end surfaces of each of the thus obtained fiber wavelength-conversion elements were observed by using an optical microscope, it was found that in the case of film formation at 25° C., the saturation temperature of the solution, the end surfaces of the crystal forming the core were specular, but some elution of the crystal was observed. Further, in the case of film formation at 24.5° C., deposition of PRA crystal on the fiber end surfaces was observed.

TABLE 1

| Comparative Example No. | Compounds | Weight Parts |
|---|---|---|
| 3 | $\{CH_2-C(CH_3)(COO(CH_2)_2(CF_2)_7CF_3)\}_x\{CH_2-C(CH_3)(COO\text{-dicyclopentadienyl})\}_y\{CH_2-C(CH_3)(COO\text{-bornyl})\}_z$ | 10 |
| 4 | $CH_2{=}CHOOCH_2C(CH_3)(CH_3)CH_2OOCH{=}CH_2$ | 14 |
| 5 | $CH_2{=}CHCOOCH_2(CF_2)_6CH_2OOCCH{=}CH_2$ | 64 |
| 6 | $CH_3CH_2C{+}CH_2OOCCH{=}CH_2)_3$ | 5 |
| 7 | phenyl-C(=O)-C(cyclohexyl)(OH) | 5 |
| 8 | $(CH_2{=}CH)_2Si(OCH_3)_2$ | 2 | x:y:z = 1:8:1

COMPARATIVE EXAMPLE 9

10 g of polymethyl methacrylate was dissolved in 100 ml of methyl ethyl ketone, and saturated with PRA at 25° C. Macromolecular films were formed on fiber end surfaces by using the solution in the same manner as in Example 1.

As a result, a large quantity of methyl ethyl ketone evaporated which had been deposited by PRA, and the core could not be observed even by using an optical microscope.

EXAMPLE 2

A fiber wavelength-conversion element was prepared in the same manner as in Example 1 except that a styrene-acryl copolymer was used in place of the polyacrylic acid.

When end surfaces of the prepared fiber wavelength-conversion element were observed by using an optical microscope, it was found that crystal of PRA forming the core was not dissolved but the end surfaces were observed to be specular.

EXAMPLE 3

A fiber wavelength-conversion element was prepared in the same manner as in Example 1 except that a styrene-silicone copolymer was used in place of the polyacrylic acid.

When the end surfaces of the prepared fiber wavelength-conversion element were observed by using an optical microscope, it was found that the crystal of PRA forming the core was not dissolved but the end surfaces were observed to be specular.

EXAMPLE 4

A fiber wavelength-conversion element was prepared in the same manner as in Example 1 except that polyvinyl acetate was used in place of the polyacrylic acid.

When the end surfaces of the prepared fiber wavelength-conversion element were observed by using an optical microscope, it was found that the crystal of PRA forming the core was not dissolved but the end surfaces were observed to be specular.

EXAMPLES 5-16

Fiber wavelength-conversion elements were prepared in the same manner as in Example 1 except that organic nonlinear optical materials shown in Table 2 were used in place of PRA.

The compounds in Examples 10 to 12 are organic nonlinear optical materials which are very rapidly sublimated. When each of these compounds was used, fiber cutting was performed in the same aqueous solution as in those of the previous examples in which the nonlinear optical material was dissolved approximately to the saturation concentration. Macromolecular films were formed on the cut surfaces which were to be used as the end surfaces.

When the end surfaces of the fiber wavelength-conversion element obtained in each of the above examples was observed by using an optical microscope, it was found that the nonlinear optical crystal which was the core was not dissolved.

EXAMPLE 17

A fiber element in which PRA crystal was used as the core was produced in the same manner as in Example 1 except that the clad was formed in a glass capillary tube made of SF4 glass and with an inner diameter of 1.5 μm and an outer diameter of 1 mm.

An outgoing end surface of the fiber element was ground by using abrasives (Imperial Lapping Film produced by SUMITOMO 3M Co., Ltd.) having mean particle sizes of 12 μm, 5 μm, 3 μm, and 1 μm in this order. When the outgoing end surface was observed by using a scanning-type electron microscope, it was found that by the grinding, the core in the end surface was cut more deeply than the clad of the same thereby forming a recess portion in the clad which was densely filled with abrasive particles, abrasive dust of the clad, and polymers from a film on which the abrasive polymers were carried. Further, a macromolecular film was formed on an incident end surface of the fiber element in the same manner as in Example 1, thus obtaining a fiber wavelength-conversion element as shown in FIG. 3.

Even after the fiber wavelength-conversion element was maintained at 23° C. for one month, the core in the incident end surface was observed to be specular. No sublimation of crystal forming the core was observed in the outgoing end surface.

Moreover, a second harmonic obtained by coupling YAGA laser light having a wavelength of 0.6 μm with the wavelength conversion element was collimated by using a conical collimator lens disclosed in Japanese Patent Unexamined Publication No. Hei. 1-287531 and was focused through a spherical lens. Thus, the second harmonic was focused to a limitation of diffraction.

TABLE 2

| Example No. | Compounds |
|---|---|
| 5 | $NO_2$—⟨benzene⟩—NHCOCH$_3$, N(CH$_3$)$_2$ |
| 6 | CN—⟨benzene⟩—N⟨pyrrole⟩ |
| 7 | CN—⟨benzene⟩—N⟨imidazole-C$_2$H$_5$⟩ |
| 8 | CN—⟨benzene⟩—N⟨pyrrolidine-CH$_2$OH⟩ |
| 9 | CH$_3$CO—⟨benzene⟩—N⟨pyrrolidine-CH$_2$OH⟩ |
| 10 | NO$_2$—⟨pyridine⟩—OCH$_3$ |
| 11 | CH$_3$S—⟨benzene⟩—COCH$_3$ |

TABLE 2-continued

| Example No. | Compounds |
|---|---|
| 12 | CH$_3$O—⟨benzene, OH⟩—CHO |
| 13 | NO$_2$—⟨pyridine⟩—OH |
| 14 | OH—⟨benzene⟩—CO$_2$CH$_3$ |
| 15 | CN—⟨benzene⟩—N(CH$_3$)(CH$_2$CN) |
| 16 | NO$_2$—⟨benzene⟩—N⟨pyrrolidine-CH$_2$OH⟩ |

From the Examples 1 through 17 and Comparative Examples 1 through 9, it was found that a macromolecular film is formed on a fiber end surface without changing the state of the core end surface in the fiber wavelength-conversion element obtained by the method according to the present invention.

As described above, in the method of producing a fiber wavelength-conversion element according to the present invention, macromolecular films are formed on the end surfaces of a fiber without changing the states of the end surfaces of a core so as to make it possible to stably produce a fiber wavelength-conversion element having macromolecular films at its end surfaces without reducing the incident coupling efficiency of a fundamental wave. Further, in a fiber wavelength-conversion element obtained according to the present invention, organic nonlinear optical crystal which is the core never contacts with an atmosphere such as air or the like because the macromolecular films are formed on the opposite end surfaces of the fiber so that there is no possibility that the organic nonlinear optical crystal is sublimated or changed in quality.

Further, in another method of producing a fiber wavelength-conversion element according to the present invention, organic nonlinear optical crystal which is a core is prevented from contacting with an atmosphere such as air or the like by a macromolecular film formed in the same manner in the foregoing case on an incident end surface and by particles with which a recess portion is filled on an outgoing end surface of the same, so that there is no possibility that the organic nonlinear optical crystal is sublimated or changed in quality.

What is claimed is:

1. A method of producing a fiber wavelength-conversion element comprising the steps of:

forming a crystal of an organic nonlinear optical material extending throughout an inside cavity of a glass capillary tube;

applying an aqueous solution to at least one of an incident end and an outgoing end of said tube, wherein said aqueous solution comprises dispersed macromolecules and said organic nonlinear optical material; and drying said applied aqueous solution to form a macromolecular film.

2. A method of forming said crystal extending throughout said inside cavity of said glass capillary tube according to claim 1, comprising the steps of filling said tube with a fused liquid of said organic nonlinear optical material;

cooling said tube to form a crystallized liquid;

fusing said crystallized liquid;

cooling said tube from one end of said tube to an opposite end of said tube to form a single crystal extending throughout said tube.

3. A method of forming said crystal extending throughout said inside cavity of said glass capillary tube according to claim 1, comprising the steps of filling said tube with a solution having an organic nonlinear optical material dissolved therein;

heating said solution in said tube;

cooling rapidly an end of said tube to deposit a polycrystal;

cooling slowly the solution in said tube beginning at said polycrystal deposited end of said tube and working toward an opposite end of said tube to form a single crystal extending throughout said tube.

4. A method according to claim 1 wherein said dispersed macromolecules are selected from the group consisting of: polymethyl methacrylate, polyethyl methacrylate, polypropyl methacrylate, polybutyl methacrylate, polystyrene, styrene-acrylonitrile copolymer, acrylonitrile-butadiene-styrene copolymer, styrene-silicone copolymer, polyvinyl acetate, vinyl acetate-vinyl chloride copolymer, vinyl acetate-acrylonitrile copolymer, vinyl acetate-acrylic acid copolymer, vinyl acetate-acrylic acid copolymer, vinyl acetate-maleic acid copolymer, and vinyl acetate-ethylene copolymer.

5. An method according to claim 4 wherein the concentration of dispersed macromolecules in said solution is 5-30 weight %.

6. A method of producing a fiber wavelength-conversion element comprising the steps of:

forming a crystal of an organic nonlinear optical material extending throughout an inside cavity of a glass capillary tube;

removing an amount of said crystal at an outgoing end of said tube to form a hollow portion;

packing particles of abrasive material and macromolecules in said hollow portion;

applying an aqueous solution to an incident end of said tube, wherein said aqueous solution comprises dispersed macromolecules and said organic nonlinear optical material; and drying said applied aqueous solution to form a macromolecular film.

7. A method of forming said crystal extending throughout said inside cavity of said glass capillary tube according to claim 6, comprising the steps of filling said tube with a fused liquid of said organic nonlinear optical material;

cooling said tube to form a crystallized liquid;

fusing said crystallized liquid;

cooling said tube from one end of said tube to an opposite end of said tube to form a single crystal extending throughout said tube.

8. A method of forming said crystal extending throughout said inside cavity of said glass capillary tube according to claim 6, comprising the steps of filling said tube with a solution having an organic nonlinear optical material dissolved therein;

heating said solution in said tube;

cooling rapidly an end of said tube to deposit a polycrystal;

cooling slowly the solution in said tube beginning at said polycrystal deposited end of said tube and working toward an opposite end of said tube to form a single crystal extending throughout said tube.

9. A method according to claim 6 wherein said dispersed macromolecules are selected from the group consisting of: polymethyl methacrylate, polyethyl methacrylate, polypropyl methacrylate, polybutyl methacrylate, polystyrene, styrene-acrylonitrile copolymer, acrylonitrile-butadiene-styrene copolymer, styrene-silicone copolymer, polyvinyl acetate, vinyl acetate-vinyl chloride copolymer, vinyl acetate-acrylonitrile copolymer, vinyl acetate-acrylic acid copolymer, vinyl acetate-acrylic acid copolymer, vinyl acetate-maleic acid copolymer, and vinyl acetate-ethylene copolymer.

10. An method according to claim 9 wherein the dispersed macromolecules are from 5 to 30 weight %. of said solution.

11. A wavelength conversion element comprising:

an organic nonlinear optical crystal core, and a glass cladding, wherein at least one of an incident end and an outgoing end of said wavelength conversion element have a macromolecular film coating.

12. A wavelength conversion element according to claim 11, wherein said outgoing end comprises a hollow portion packed with particles of abrasive material and macromolecules.

13. A wavelength conversion element according to claim 11 wherein said cladding has an inner diameter approximately the same as an outer diameter of said core.

* * * * *